No. 654,713. Patented July 31, 1900.
O. COLBORNE.
LINING HOOP ATTACHING MACHINE.
(Application filed Apr. 30, 1900.)
(No Model.) 2 Sheets—Sheet 2.
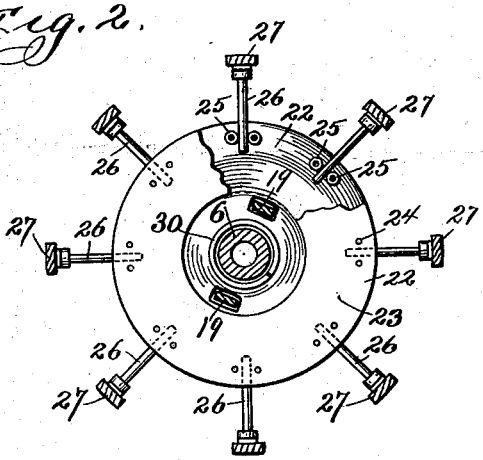
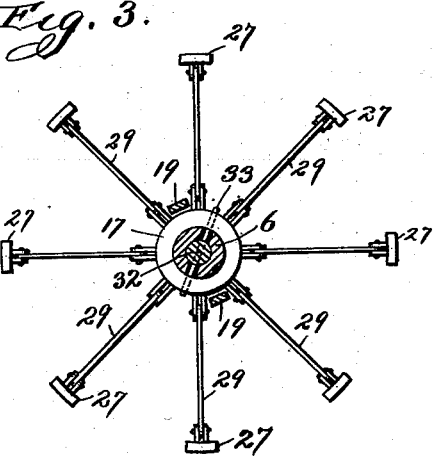
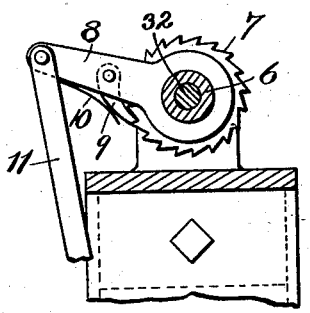
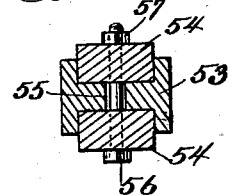
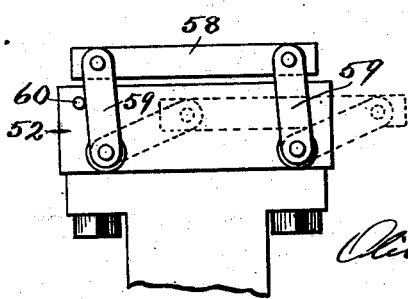
Witnesses:
R. J. Jacker.
Glen C. Stephens.
Inventor:
Oliver Colborne
By Wm R Rummler
his Atty

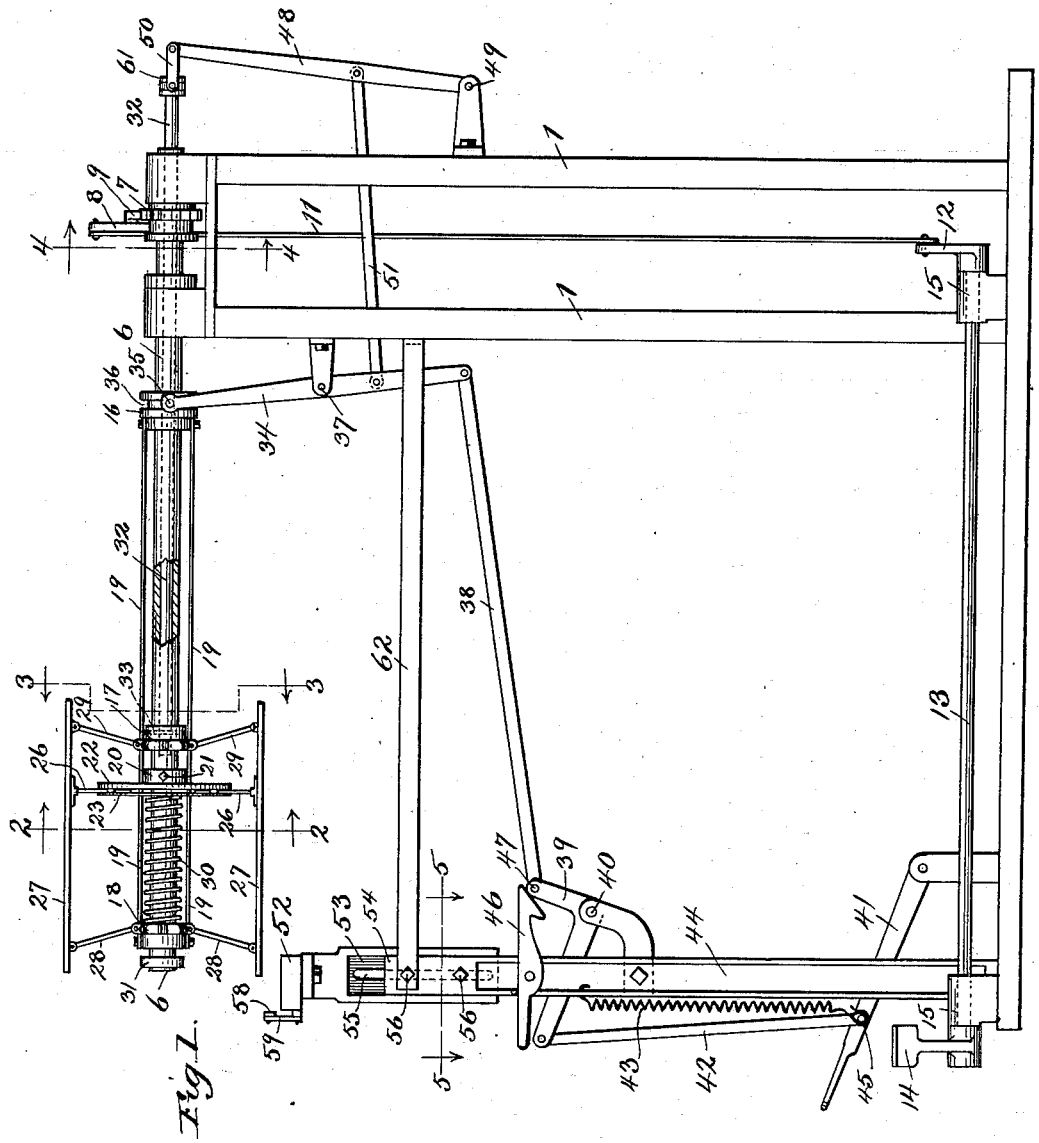

UNITED STATES PATENT OFFICE.

OLIVER COLBORNE, OF CHICAGO, ILLINOIS, ASSIGNOR TO THE TOMLINSON VENEER BARREL COMPANY, OF INDIANAPOLIS, INDIANA.

LINING-HOOP-ATTACHING MACHINE.

SPECIFICATION forming part of Letters Patent No. 654,713, dated July 31, 1900.

Application filed April 30, 1900. Serial No. 14,890. (No model.)

*To all whom it may concern:*

Be it known that I, OLIVER COLBORNE, a citizen of the United States of America, and a resident of Chicago, in the county of Cook and State of Illinois, have invented certain new and useful Improvements in Lining-Hoop-Attaching Machines, of which the following is a specification.

The main object of my invention is to provide an improved device for attaching lining-hoops to cylindrical veneer packages.

The particular objects of different features of construction shown will be understood from the following description with reference to the accompanying drawings, in which—

Figure 1 is a side elevation of a machine constructed according to my invention, showing the drum partly in section and showing the outer shaft partly broken away. Fig. 2 is a vertical section of the drum on the line 2 2 of Fig. 1. Fig. 3 is a vertical section on the line 3 3. Fig. 4 is a vertical section on the line 4 4 of Fig. 1. Fig. 5 is a horizontal section on the line 5 5 of Fig. 1. Fig. 6 is a front elevation of the upper part of the anvil, showing in dotted lines the lower position of the stop for abutting the front of the veneer package.

The device shown consists, mainly, of a supporting-frame having journaled therein a shaft carrying a collapsible drum, a vertically-adjustable anvil under the front end of said drum, and mechanism for collapsing and rotating said drum.

The standards 1 of the frame have a hollow shaft 6 journaled therein. The ratchet-wheel 7 is rigidly mounted on said shaft. The arm 8 is loose on said shaft and carries the pawl 9 and a spring 10, which keeps said pawl in engagement with the ratchet-wheel 7. The rod 11 is pivoted at one end to the arm 8 and at the other end to the crank 12. Said crank is rigid on the rock-shaft 13, which is operated by the step 14. The rock-shaft 13 is journaled in the bearing-pieces 15 of the frame. The sleeves 16, 17, and 18 are slidingly mounted on the hollow shaft 6 and keyed thereto against relative rotation. The sleeve 18 is connected with the sleeve 16 by the arms 19.
Said arms are not secured to the sleeve 17. The collar 20 is rigidly secured to the hol- low shaft 6 by means of the set-screw 21. The disk 22 is rigidly supported by the collar 20. The ring 23 is secured to the disk 22 by means of the pins 24. Said pins have mounted thereon the washers 25 between the ring 23 and the disk 22. The arms 26 are rigidly secured to the segments 27 of the drum. Said arms are each seated between a pair of the washers 25, being longitudinally movable between the ring 23 and disk 22. The arms 28 and 29 are pivoted at their outer ends to the segments 27 and at their inner ends to the sleeves 18 and 17, respectively. The spring 30 surrounds the shaft 6, operating between the disk 22 and the sleeve 18 to urge said sleeve normally toward the shoulder 31 of the shaft 6. The inner shaft 32 is longitudinally slidable in said shaft 6 and is secured to the sleeve 17 by means of the pin 33. Said pin projects through suitable slots in the shaft 6, thus permitting the sleeve 17 to be moved with the inner shaft 32 longitudinally of said shaft 6. The lever 34 has a pin 35 at its upper end operating in the groove 36 of the sleeve 16. The lever 34 is pivoted to the frame at 37 and has the arm 38 pivoted to its lower end. The bell-crank 39 is pivoted to the frame at 40 and connected to the lever 41 by the pivoted arm 42. The spring 43 is secured at its upper end to the standard 44 of the anvil and is secured at its lower end to the pin 45. The latch 46 is pivoted to the standard 44 in position to engage the pin 47 when the lever 41 is depressed. The lever 48 is pivoted to the frame at 49 and has a link 50 connecting same with the collar 61, which engages the shaft 32, so as to permit the revolution of same. The arm 51 is pivoted to the levers 34 and 48. The anvil 52 has the downwardly-extending part 53 seated between the uprights 54 of the standard 44. Said member 53 is provided with a vertical slot 55. The bolts 56 are seated in the members 54 and pass through the slot 55. Said bolts are provided with ends 57, whereby the members 54 are firmly drawn together against the member 53. The stop 58 is pivoted to the anvil by means of the arms 59. The pivots holding said arms are tightened, so that the stop 58 will be held in the position to which same is moved by the operator. The pin 60 limits the movement of the stop 58 toward the left of Fig. 6. The brace 62 is secured to the members 1 of the frame and to the standards of the anvil, said brace being designed to steady the anvil.

The operation of the device shown is as follows: The operator will first collapse the drum by depressing the lever 41. This serves to draw the sleeve 18 inwardly through the action of the sleeve 16, which is moved toward the left of Fig. 1 by means of the lever 34. The shaft 32 will at the same time be moved toward the left of Fig. 1 through the action of the lever 48. The pin 33, acting upon the sleeve 17, will move same inwardly toward the left of Fig. 1. This will serve to draw the segments 27 inwardly toward their supporting-shaft. The latch 46 will engage the pin 47, thus holding the drum in the collapsed position. The operator will now place the veneer package upon the drum with its front edge abutting against the stop 58. The operator will then depress the free end of the latch 46, thus releasing the pin 47 and permitting the drum to expand through the action of the springs 30 and 43. The operator will then insert the strip from which the lining-hoop is to be formed at the edge of the package abutting against the stop 58. He will then depress the step 14, so as to rotate the package at intervals through the action of the pawl and ratchet during the process of nailing the hoop to the package. The segments 27 bear against the inside of the package, so as to rotate the package with said segments. The stop 58 may be moved down to the position shown by dotted lines in Fig. 6 before the package is placed upon the drum and before same is removed therefrom. To remove the package, the drum is again collapsed, as before described.

The anvil is made vertically adjustable to allow for packages of different sizes.

It will be understood that numerous details of the device shown may be altered without departing from the spirit of my invention. I therefore do not confine myself to such details except as hereinafter limited in the claims.

What I claim as my invention, and desire to secure by Letters Patent, is—

1. In a machine for attaching lining-hoops to veneer packages, the combination of a supporting-frame, a shaft supported at one end on said frame, and having its other end free therefrom, a collapsible drum mounted on said shaft for supporting the veneer package, means for collapsing and expanding said drum, means for rotating said drum, and an anvil for abutting the outer surface of the package and adjustable toward and from said surface, substantially as described.

2. The combination of a supporting-frame, a hollow shaft journaled at one end in said frame and having its other end free therefrom, a pair of sleeves slidingly mounted on said shaft and keyed against relative rotation, a guide rigidly mounted on said shaft for slidingly engaging radial arms, a drum consisting of a series of drum-segments each having an arm slidingly engaged by said guide and each having arms pivoted to said sleeves, a third sleeve slidingly mounted on said shaft and connected to one of said pair of sleeves, an inner shaft longitudinally movable in said hollow shaft and connected to the other of said pair of sleeves, an anvil adjustable toward and from the periphery of the drum at its free end, a foot-lever located under the free end of the drum, means connecting said foot-lever with the third sleeve and inner shaft and adapted through the movement of said foot-lever to simultaneously move said third sleeve and inner shaft in opposite directions for expanding or collapsing the drum, and means for rotating said shafts, substantially as described.

Signed by me at Chicago, Illinois, this 26th day of April, 1900.

OLIVER COLBORNE.

Witnesses:
WM. R. RUMMLER,
CHAS. H. BORCHERS.